(12) United States Patent
Coleman et al.

(10) Patent No.: US 7,852,009 B2
(45) Date of Patent: Dec. 14, 2010

(54) LIGHTING DEVICE CIRCUIT WITH SERIES-CONNECTED SOLID STATE LIGHT EMITTERS AND CURRENT REGULATOR

(75) Inventors: Thomas G. Coleman, Pittsboro, NC (US); Peter J. Myers, Raleigh, NC (US); Antony Paul Van De Ven, Sai Kung (HK); Gerald H. Negley, Durham, NC (US)

(73) Assignee: Cree, Inc., Durham, NC (US)

( * ) Notice: Subject to any disclaimer, the term of this patent is extended or adjusted under 35 U.S.C. 154(b) by 235 days.

(21) Appl. No.: 11/626,483

(22) Filed: Jan. 24, 2007

(65) Prior Publication Data

US 2007/0171145 A1    Jul. 26, 2007

Related U.S. Application Data

(60) Provisional application No. 60/761,879, filed on Jan. 25, 2006, provisional application No. 60/809,959, filed on Jun. 1, 2006.

(51) Int. Cl.
*H05B 37/00* (2006.01)

(52) U.S. Cl. .................. 315/185 S; 315/247; 315/291; 315/312; 315/224

(58) Field of Classification Search .............. 315/185 S, 315/200 A, 312–325; 362/800–803, 806, 362/812
See application file for complete search history.

(56) References Cited

U.S. PATENT DOCUMENTS

| | | | |
|---|---|---|---|
| 4,298,869 A | 11/1981 | Okuno | |
| 4,685,303 A * | 8/1987 | Branc et al. | 62/3.3 |
| 4,859,911 A | 8/1989 | Kinnard et al. | |
| 5,825,137 A * | 10/1998 | Titus | 315/291 |

(Continued)

FOREIGN PATENT DOCUMENTS

EP    1 033 903    9/2000

(Continued)

OTHER PUBLICATIONS

Optoled Lighting GmbH | LED, Product Sheets, http://www.optoled.de/english/products/led.html, pp. 1-7 (Date Unknown).

(Continued)

*Primary Examiner*—Tuyet Thi Vo
(74) *Attorney, Agent, or Firm*—Burr & Brown (57) ABSTRACT

A circuit for a lighting device comprises a sub-circuit which comprises a series current regulator and a group of solid state light emitters. The current regulator and the solid state light emitters are arranged in series. In some embodiments, the circuit further comprises a fan electrically connected in series in the sub-circuit. In some embodiments, the circuit further comprises a second sub-circuit which comprises a second series current regulator and a second group of solid state light emitters, the first sub-circuit and the second sub-circuit being arranged in parallel. In some embodiments, an anode of the series current regulator is electrically connected to a cathode of one of the solid state light emitters. Also, methods of lighting wherein a sum of voltage drops across light emitters and a current regulator is in the range of from 1.2 to 1.6 times the line voltage.

25 Claims, 2 Drawing Sheets

U.S. PATENT DOCUMENTS

| | | | |
|---|---|---|---|
| 6,076,936 | A | 6/2000 | George |
| 6,082,870 | A | 7/2000 | George |
| 6,169,391 | B1 * | 1/2001 | Lei .......................... 323/266 |
| 6,351,079 | B1 * | 2/2002 | Willis ..................... 315/200 A |
| 6,359,392 | B1 | 3/2002 | He |
| 6,416,200 | B1 | 7/2002 | George |
| 6,459,919 | B1 | 10/2002 | Lys et al. |
| 6,515,434 | B1 | 2/2003 | Biebl |
| 6,578,986 | B2 | 6/2003 | Swaris et al. |
| 6,712,486 | B1 | 3/2004 | Popovich et al. |
| 6,793,374 | B2 | 9/2004 | Begemann |
| 6,846,093 | B2 | 1/2005 | Swaris et al. |
| 7,015,654 | B1 | 3/2006 | Kuhlmann et al. |
| 7,102,172 | B2 | 9/2006 | Lynch et al. |
| 7,108,396 | B2 | 9/2006 | Swaris et al. |
| 7,114,831 | B2 | 10/2006 | Popovich et al. |
| 7,213,940 | B1 * | 5/2007 | Van De Ven et al. ........ 362/231 |
| 7,239,087 | B2 * | 7/2007 | Ball .......................... 315/128 |
| 7,276,861 | B1 | 10/2007 | Shteynberg et al. |
| 7,301,288 | B2 | 11/2007 | Green |
| 7,306,353 | B2 | 12/2007 | Popovich et al. |
| 7,323,828 | B2 | 1/2008 | Russell et al. |
| 7,329,024 | B2 | 2/2008 | Lynch et al. |
| 7,387,406 | B2 | 6/2008 | Swaris et al. |
| 7,420,335 | B2 * | 9/2008 | Robinson et al. ............ 315/224 |
| 7,474,044 | B2 | 1/2009 | Ge |
| 7,524,085 | B2 * | 4/2009 | Bedson et al. ........... 315/185 S |
| 2002/0145392 | A1 | 10/2002 | Hair, III et al. |
| 2004/0046510 | A1 * | 3/2004 | Allen ..................... 315/185 S |
| 2004/0135522 | A1 | 7/2004 | Berman et al. |
| 2004/0195983 | A1 * | 10/2004 | Toyota et al. ............... 315/312 |
| 2004/0230102 | A1 * | 11/2004 | Anderson et al. ........... 600/231 |
| 2005/0035728 | A1 | 2/2005 | Schanberger et al. |
| 2005/0077838 | A1 | 4/2005 | Blumel |
| 2005/0093473 | A1 | 5/2005 | Yeh et al. |
| 2005/0243556 | A1 | 11/2005 | Lynch |
| 2005/0251698 | A1 | 11/2005 | Lynch et al. |
| 2006/0001381 | A1 | 1/2006 | Robinson et al. |
| 2006/0139954 | A1 | 6/2006 | Kobori et al. |
| 2006/0176411 | A1 | 8/2006 | Furukawa |
| 2006/0267028 | A1 | 11/2006 | Lynch et al. |
| 2007/0041220 | A1 | 2/2007 | Lynch |
| 2007/0211463 | A1 * | 9/2007 | Chevalier et al. ........... 362/249 |
| 2008/0055915 | A1 | 3/2008 | Lynch et al. |
| 2008/0062699 | A1 | 3/2008 | Popovich et al. |
| 2008/0192462 | A1 | 8/2008 | Steedly et al. |

FOREIGN PATENT DOCUMENTS

| | | |
|---|---|---|
| GB | 2 283 378 A * | 5/1995 |
| WO | 01/63977 | 8/2001 |
| WO | 2004/060023 | 7/2004 |

OTHER PUBLICATIONS

Permlight LED Fixtures (1 page) Feb. 2005.
U.S. Appl. No. 11/613,692, filed Dec. 20, 2006.
U.S. Appl. No. 11/614,180, filed Dec. 21, 2006.
U.S. Appl. No. 11/613,714, filed Dec. 20, 2006.
U.S. Appl. No. 11/613,733, filed Dec. 20, 2006.
U.S. Appl. No. 11/624,811, filed Jan. 19, 2007.
U.S. Appl. No. 11/743,754, filed May 3, 2007.
U.S. Appl. No. 11/751,982, filed May 22, 2007.
U.S. Appl. No. 11/753,103, filed May 24, 2007.
U.S. Appl. No. 11/751,990, filed May 22, 2007.
U.S. Appl. No. 11/736,761, filed Apr. 18, 2007.
U.S. Appl. No. 11/736,799, filed Apr. 18, 2007.
U.S. Appl. No. 11/737,321, filed Apr. 19, 2007.
U.S. Appl. No. 11/755,153, filed May 30, 2007.
U.S. Appl. No. 11/755,162, filed May 30, 2007.
U.S. Appl. No. 11/856,421, filed Sep. 17, 2007.
U.S. Appl. No. 11/854,744, filed Sep. 13, 2007.
U.S. Appl. No. 11/859,048, filed Sep. 21, 2007.
U.S. Appl. No. 11/936,163, filed Nov. 7, 2007.
U.S. Appl. No. 11/843,243, filed Aug. 22, 2007.
U.S. Appl. No. 11/948,021, filed Nov. 30, 2007.
U.S. Appl. No. 11/939,052, filed Nov. 13, 2007.
U.S. Appl. No. 11/877,038, filed Oct. 23, 2007.
U.S. Appl. No. 11/870,679, filed Oct. 11, 2007.
U.S. Appl. No. 11/745,713, filed May 8, 2007.
U.S. Appl. No. 11/601,504, filed Nov. 17, 2006.
U.S. Appl. No. 11/939,059, filed Nov. 13, 2007.

* cited by examiner

LIGHTING DEVICE CIRCUIT WITH SERIES-CONNECTED SOLID STATE LIGHT EMITTERS AND CURRENT REGULATOR

CROSS-REFERENCE TO RELATED APPLICATIONS

This application claims the benefit of U.S. Provisional Patent Application No. 60/761,879, filed Jan. 25, 2006, the entirety of which is incorporated herein by reference.

This application claims the benefit of U.S. Provisional Patent Application No. 60/809,959, filed Jun. 1, 2006, the entirety of which is incorporated herein by reference.

FIELD OF THE INVENTION

The present invention is directed to a circuit for a lighting device, more particularly, a circuit for a lighting device which includes a plurality of solid state light emitters. The present invention is also directed to a method of lighting using a circuit which includes a plurality of solid state light emitters.

BACKGROUND OF THE INVENTION

A large proportion (some estimates are as high as twenty-five percent) of the electricity generated in the United States each year goes to lighting. Accordingly, there is an ongoing need to provide lighting which is more energy-efficient. It is well-known that incandescent light bulbs are very energy-inefficient light sources—about ninety percent of the electricity they consume is released as heat rather than light. Fluorescent light bulbs are more efficient than incandescent light bulbs (by a factor of about 10) but are still less efficient as compared to solid state light emitters, such as light emitting diodes.

In addition, as compared to the normal lifetimes of solid state light emitters, e.g., light emitting diodes, incandescent light bulbs have relatively short lifetimes, i.e., typically about 750-1000 hours. In comparison, the lifetime of light emitting diodes, for example, can generally be measured in decades (e.g., 50,000 to 100,000 hours). Fluorescent bulbs have longer lifetimes (e.g., 10,000-20,000 hours) than incandescent lights, but provide less favorable color reproduction.

Color reproduction is typically measured using the Color Rendering Index (CRI Ra). CRI Ra is a relative measurement of how the color rendition of an illumination system compares to that of a blackbody radiator or other defined reference, i.e., it is a relative measure of the shift in surface color of an object when lit by a particular lamp. The CRI Ra equals 100 if the color coordinates of a set of test colors being illuminated by the illumination system are the same as the coordinates of the same test colors being irradiated by the reference radiator. Daylight has the highest CRI (Ra of 100), with incandescent bulbs being relatively close (Ra greater than 95), and fluorescent lighting being less accurate (typical Ra of 70-80). Certain types of specialized lighting have very low CRI (e.g., mercury vapor or sodium lamps have Ra as low as about 40 or even lower). Sodium lights are used, e.g., to light highways—driver response time, however, significantly decreases with lower CRI Ra values (for any given brightness, legibility decreases with lower CRI Ra).

Another issue faced by conventional light fixtures is the need to periodically replace the lighting devices (e.g., light bulbs, etc.). Such issues are particularly pronounced where access is difficult (e.g., vaulted ceilings, bridges, high buildings, traffic tunnels) and/or where change-out costs are extremely high. The typical lifetime of conventional fixtures is about 20 years, corresponding to a light-producing device usage of at least about 44,000 hours (based on usage of 6 hours per day for 20 years). Light-producing device lifetime is typically much shorter, thus creating the need for periodic change-outs.

Accordingly, for these and other reasons, efforts have been ongoing to develop ways by which solid state light emitters can be used in place of incandescent lights, fluorescent lights and other light-generating devices in a wide variety of applications. In addition, where light emitting diodes (or other solid state light emitters) are already being used, efforts are ongoing to provide light emitting diodes (or other solid state light emitters) which are improved, e.g., with respect to energy efficiency, color rendering index (CRI Ra), contrast, efficacy (1 m/W), and/or duration of service.

A variety of solid state light emitters are well-known. For example, one type of solid state light emitter is a light emitting diode.

Light emitting diodes are semiconductor devices that convert electrical current into light. A wide variety of light emitting diodes are used in increasingly diverse fields for an ever-expanding range of purposes.

More specifically, light emitting diodes are semiconducting devices that emit light (ultraviolet, visible, or infrared) when a potential difference is applied across a p-n junction structure. There are a number of well-known ways to make light emitting diodes and many associated structures, and the present invention can employ any such devices. By way of example, Chapters 12-14 of Sze, Physics of Semiconductor Devices, (2d Ed. 1981) and Chapter 7 of Sze, Modem Semiconductor Device Physics (1998) describe a variety of photonic devices, including light emitting diodes.

The expression "light emitting diode" is used herein to refer to the basic semiconductor diode structure (i.e., the chip). The commonly recognized and commercially available "LED" that is sold (for example) in electronics stores typically represents a "packaged" device made up of a number of parts. These packaged devices typically include a semiconductor based light emitting diode chip such as (but not limited to) those described in U.S. Pat. Nos. 4,918,487; 5,631,190; and 5,912,477; various wire connections, and a package that encapsulates the light emitting diode chip.

As is well-known, a light emitting diode produces light by exciting electrons across the band gap between a conduction band and a valence band of a semiconductor active (light-emitting) layer. The electron transition generates light at a wavelength that depends on the band gap. Thus, the color of the light (wavelength) emitted by a light emitting diode depends on the semiconductor materials of the active layers of the light emitting diode.

Although the development of light emitting diodes has in many ways revolutionized the lighting industry, some of the characteristics of light emitting diodes have presented challenges, some of which have not yet been fully met. For example, the emission spectrum of any particular light emitting diode is typically concentrated around a single wavelength (as dictated by the light emitting diode's composition and structure), which is desirable for some applications, but not desirable for others, (e.g., for providing lighting, such an emission spectrum provides a very low CRI).

Because light that is perceived as white is necessarily a blend of light of two or more colors (or wavelengths), no single light emitting diode junction has been developed that can produce white light. "White" LED lamps have been produced which have a light emitting diode pixel formed of respective red, green and blue light emitting diodes. Another "white" LED which has been produced includes (1) a light emitting diode which generates blue light and (2) a luminescent material (e.g., a phosphor) that emits yellow light in response to excitation by light emitted by the light emitting diode, whereby the blue light and the yellow light, when mixed, produce light that is perceived as white light.

In addition, the blending of primary colors to produce combinations of non-primary colors is generally well understood in this and other arts. In general, the 1931 CIE Chromaticity Diagram (an international standard for primary colors established in 1931), and the 1976 CIE Chromaticity Diagram (similar to the 1931 Diagram but modified such that similar distances on the Diagram represent similar perceived differences in color) provide useful reference for defining colors as weighted sums of primary colors.

The CRI of efficient white LEDs is generally low (in the range 65-75) as compared to incandescent light sources (CRI 100). Additionally, the color temperature for LEDs is generally "cooler" (~5500K) and less desirable than the color temperature of incandescent or CCFL bulbs (~2700K). Both of these deficiencies in LEDs can be improved by the addition of other LEDs or lumiphors of selected saturated colors. As indicated above, light sources according to the present invention can utilize specific color "blending" of light sources of specific (x,y) color chromaticity coordinates. For example, light from additional selected saturated sources can be mixed with the broad spectrum source(s) to provide uniform illumination without any areas of discoloration; and if desired, for cosmetic reasons, the individual light emitters can be made to be not visible as discrete devices or discrete color areas when the illumination source or aperture is viewed directly.

Light emitting diodes can thus be used individually or in any combinations, optionally together with one or more luminescent material (e.g., phosphors or scintillators) and/or filters, to generate light of any desired perceived color (including white). Accordingly, the areas in which efforts are being made to replace existing light sources with light emitting diode light sources, e.g., to improve energy efficiency, color rendering index (CRI), efficacy (1 m/W), and/or duration of service, are not limited to any particular color or color blends of light.

A wide variety of luminescent materials (also known as lumiphors or luminophoric media, e.g., as disclosed in U.S. Pat. No. 6,600,175, the entirety of which is hereby incorporated by reference) are well-known and available to persons of skill in the art. For example, a phosphor is a luminescent material that emits a responsive radiation (e.g., visible light) when excited by a source of exciting radiation. In many instances, the responsive radiation has a wavelength which is different from the wavelength of the exciting radiation. Other examples of luminescent materials include scintillators, day glow tapes and inks which glow in the visible spectrum upon illumination with ultraviolet light.

Luminescent materials can be categorized as being down-converting, i.e., a material which converts photons to a lower energy level (longer wavelength) or up-converting, i.e., a material which converts photons to a higher energy level (shorter wavelength).

Inclusion of luminescent materials in LED devices has been accomplished by adding the luminescent materials to a clear plastic encapsulant material (e.g., epoxy-based or silicone-based material) as discussed above, for example by a blending or coating process.

For example, U.S. Pat. No. 6,963,166 (Yano '166) discloses that a conventional light emitting diode lamp includes a light emitting diode chip, a bullet-shaped transparent housing to cover the light emitting diode chip, leads to supply current to the light emitting diode chip, and a cup reflector for reflecting the emission of the light emitting diode chip in a uniform direction, in which the light emitting diode chip is encapsulated with a first resin portion, which is further encapsulated with a second resin portion. According to Yano '166, the first resin portion is obtained by filling the cup reflector with a resin material and curing it after the light emitting diode chip has been mounted onto the bottom of the cup reflector and then has had its cathode and anode electrodes electrically connected to the leads by way of wires. According to Yano '166, a phosphor is dispersed in the first resin portion so as to be excited with the light A that has been emitted from the light emitting diode chip, the excited phosphor produces fluorescence ("light B") that has a longer wavelength than the light A, a portion of the light A is transmitted through the first resin portion including the phosphor, and as a result, light C, as a mixture of the light A and light B, is used as illumination.

As noted above, "white LED lights" (i.e., lights which are perceived as being white or near-white) have been investigated as potential replacements for white incandescent lamps. A representative example of a white LED lamp includes a package of a blue light emitting diode chip, made of gallium nitride (GaN), coated with a phosphor such as YAG. In such an LED lamp, the blue light emitting diode chip produces an emission with a wavelength of about 450 nm, and the phosphor produces yellow fluorescence with a peak wavelength of about 550 nm on receiving that emission. For instance, in some designs, white light emitting diodes are fabricated by forming a ceramic phosphor layer on the output surface of a blue light-emitting semiconductor light emitting diode. Part of the blue ray emitted from the light emitting diode chip passes through the phosphor, while part of the blue ray emitted from the light emitting diode chip is absorbed by the phosphor, which becomes excited and emits a yellow ray. The part of the blue light emitted by the light emitting diode which is transmitted through the phosphor is mixed with the yellow light emitted by the phosphor. The viewer perceives the mixture of blue and yellow light as white light.

As also noted above, in another type of LED lamp, a light emitting diode chip that emits an ultraviolet ray is combined with phosphor materials that produce red (R), green (G) and blue (B) light rays. In such an LED lamp, the ultraviolet ray that has been radiated from the light emitting diode chip excites the phosphor, causing the phosphor to emit red, green and blue light rays which, when mixed, are perceived by the human eye as white light. Consequently, white light can also be obtained as a mixture of these light rays.

There is an ongoing need for ways to use solid state light emitters in a wider variety of applications, with greater efficacy (1 m/W), with greater reliability and/or with longer useful life.

BRIEF SUMMARY OF THE INVENTION

Light fixtures typically connect directly into household AC line supply which is between 110VAC and 240VAC, or up to 277 VAC, depending on the country. LEDs (one type of solid state light emitter which can be employed according to the present invention) typically require a voltage of between 1.8v and 3.5v across them to operate.

Converting the line voltage to a voltage useful for solid state light emitters, e.g., LEDs, typically requires first a conversion from the line voltage, e.g., 110 VAC, 117 VAC, 220 VAC or 277 VAC, to a much lower voltage, and then the addition of a DC current regulator (analogous to a ballast) to limit the current through the solid state light emitters to the required amount. The amount of current through a solid state light emitter depends on the rating of the solid state light emitter, and is typically 20 mA for a standard LED and about 350 mA for a 1 W power LED.

Known methods used to convert the power include employing a reactive element or resistive element in series with the solid state light emitters (e.g., LED(s)) to act as a current limiter. A major disadvantage of such an arrangement is that the excess voltage; i.e. the difference between the line voltage (e.g., 110 V or 117 V) and the voltage across the solid state light emitters (e.g., in the case of LEDs, typically 2-4 V or ~30 V if 9 LEDs are connected in series) is dissipated as wasted heat. The efficiency of this method is very low; efficacy using this method can be as low as 3 lumens per watt.

Another method which has been employed is to use a transformer to first reduce the line AC voltage to a much smaller voltage, a voltage approximately the same as required by the solid state light emitters. This low voltage AC is then rectified to DC and typically series current regulated through a semiconductor chip (LM317) and applied to the string of solid state light emitters. This arrangement provides better efficiency, but the efficiency is still typically only about 50% due to losses in the transformer.

A popular and efficient method used commonly now is to construct a switching power supply to change the power from line to solid state light emitter (e.g., LED). This arrangement can typically achieve 75% efficiency and can reach as high as 90% with the use of special materials and components.

In addition to powering the solid state light emitters, the solid state light emitters need to be cooled, because solid state light emitters, particularly LEDs, tend degrade if they operate at elevated temperatures.

Finned structures, composed of thermally conductive material (heatsinks) can be used around the fixture or on the outer housing of the light bulb, however these are generally heavy and not attractive.

Additionally, in the case of downlights, the efficiency of the heatsinks is significantly reduced because the heated air is trapped in the downlight fixture.

Also, heatsinks are heavy and may require additional fixing and attachment methods to ensure that they do not fall.

There is a need for a light bulb or light fixture constructed from solid state light emitters that connects to power supply (and optionally further includes cooling means) and is highly efficient, attractive and lightweight.

The present invention is directed to a high lumen (e.g., >700 lumens ) and good efficacy (e.g., >40 lumen/watt) light fixture or light bulb which in some embodiments includes a power regulator in the fixture or bulb, i.e. which does not use a separate power regulator, to adapt the line voltage (e.g., 110 VAC, 117 VAC, 220 VAC, 277 VAC, etc.) to voltage and current requirements of the solid state light emitters. A major issue is the efficiency of the power supply and the heat generated by this loss in efficiency, as well as the heat generated by the solid state light emitters themselves.

In some embodiments according to the present invention, solid state light emitters (e.g., LEDs) are arranged in series in strings of sufficient length that the forward voltage across the solid state light emitter string is slightly less then the rectified AC main supply. By matching the forward voltage of the string to the line voltage, it is possible to minimize the amount of power lost in the conversion and regulation.

In a first aspect according to the present invention, there is provided a circuit for a lighting device, the circuit comprising at least a first sub-circuit which comprises at least a first series current regulator and a first group of solid state light emitters. In this aspect of the present invention, the first group of solid state light emitters comprises a plurality of first group solid state light emitters. In addition, in this aspect of the present invention, the first series current regulator and the plurality of first group solid state light emitters are arranged in series.

In some embodiments according to the first aspect of the present invention, the circuit further comprises at least one rectifier and/or at least one capacitor.

In some embodiments according to the first aspect of the present invention, the circuit further comprises at least one fan which is electrically connected in series in at least the first sub-circuit.

In some embodiments according to the first aspect of the present invention, the circuit further comprises at least a second sub-circuit which comprises at least a second series current regulator and a second group of solid state light emitters comprising a plurality of second group solid state light emitters. In these embodiments, the second series current regulator and the plurality of second group solid state light emitters are arranged in series, and the first sub-circuit and the second sub-circuit are arranged in parallel relative to each other. In some such embodiments, the circuit further comprises at least one fan which is electrically connected in series to at least the first sub-circuit and the second sub-circuit.

In some embodiments according to the first aspect of the present invention, an anode of the first series current regulator is electrically connected to a cathode of one of the first group solid state light emitters. In some such embodiments, all of the first group solid state light emitters are upstream of the first series current regulator.

In some embodiments according to the first aspect of the present invention, the first sub-circuit comprises at least 40 solid state light emitters.

In a second aspect according to the present invention, there is provided a method of lighting, comprising:

supplying current of a first voltage to a circuit, the circuit comprising:

at least a first sub-circuit, the first sub-circuit comprising at least a first series current regulator and a first group of solid state light emitters, the first group of solid state light emitters comprising a plurality of first group solid state light emitters, the first series current regulator and the plurality of first group solid state light emitters being arranged in series, wherein a sum of voltage drops across the plurality of first group solid state light emitters and the first series current regulator is in the range of from 1.2 to 1.6 times the first voltage.

In some embodiments according to the second aspect of the present invention, the first voltage is about 110 volts, about 220 volts or in the range of from about 90 volts to about 140 volts.

In some embodiments according to the second aspect of the present invention, the circuit comprises any of the circuits described above.

In some embodiments according to the present invention, more than the typical amount of solid state light emitters (e.g., LEDs) are employed. Typically, a light bulb or light fixture will use 1 to 18 LED devices. Some of the lights according to the present invention employ in excess of 100 LEDs.

In some embodiments according to the present invention on the other hand, high voltage LEDs can be employed, which means that the device can include fewer LEDs than are typically employed.

The invention may be more fully understood with reference to the accompanying drawings and the following detailed description of the invention.

DETAILED DESCRIPTION OF THE INVENTION

As noted above, in a first aspect according to the present invention, there is provided a circuit for a lighting device, the circuit comprising at least a first sub-circuit which comprises at least a first series current regulator and a first group of solid state light emitters.

The expression "sub-circuit", as used herein, means circuitry comprising one or more components or features contained within a circuit (under this terminology, a circuit can itself consist of a single sub-circuit).

Any type of series current regulator can be employed in the circuits according to the present invention, and where plural series current regulators are employed, the respective series current regulators can be of similar types or can include two or more different types. Persons of skill in the art are familiar with, and have access to, a variety of types of series current regulators, and any such series current regulators can be employed in the circuits according to the present invention.

Any desired solid state light emitter or emitters can be employed in accordance with the present invention. Persons of skill in the art are aware of, and have ready access to, a wide variety of such emitters. Such solid state light emitters include inorganic and organic light emitters. Examples of types of such light emitters include a wide variety of light emitting diodes (inorganic or organic, including polymer light emitting diodes (PLEDs)), laser diodes, thin film electroluminescent devices, light emitting polymers (LEPs), a variety of each of which are well-known in the art (and therefore it is not necessary to describe in detail such devices, and/or the materials out of which such devices are made).

The respective light emitters can be similar to one another, different from one another or any combination, i.e., there can be a plurality of solid state light emitters of one type, or one or more solid state light emitters of each of two or more types. That is, the solid state light emitters can differ in any of a wide variety of ways, e.g., they can be inorganic or organic, they can be polymer light emitting diodes (PLEDs)), laser diodes, thin film electroluminescent devices, light emitting polymers (LEPs), etc., they can differ in color emitted, they can differ in voltage drop and/or they can differ in size, or in any other way.

The circuits according to the present invention can comprise any desired number of solid state emitters. For example, a circuit for a lighting device according to the present invention can include 50 or more light emitting diodes, or can include 100 or more light emitting diodes, etc. In general, with current light emitting diodes, greater efficiency can be achieved by using a greater number of smaller light emitting diodes (e.g., 100 light emitting diodes each having a surface area of 0.1 $mm^2$ vs. 25 light emitting diodes each having a surface area of 0.4 $mm^2$ but otherwise being identical).

Analogously, light emitting diodes which operate at lower current densities are generally more efficient. Light emitting diodes which draw any particular current can be used according to the present invention. In one aspect of the present invention, light emitting diodes which each draw not more than 50 milliamps are employed.

As noted above, one type of solid state light emitter which can be employed are LEDs. Such LEDs can be selected from among any light emitting diodes (a wide variety of which are readily obtainable and well known to those skilled in the art, and therefore it is not necessary to describe in detail such devices, and/or the materials out of which such devices are made). For instance, examples of types of light emitting diodes include inorganic and organic light emitting diodes, a variety of each of which are well-known in the art.

Representative examples of such LEDs, many of which are known in the art, can include lead frames, lumiphors, encapsulant regions, etc.

The solid state light emitters may, if desired, comprise one or more lumiphor (i.e., luminescence region or luminescent element which comprises at least one luminescent material). The expression "lumiphor", as used herein, refers to any luminescent element, i.e., any element which includes a luminescent material. The one or more lumiphors, when provided, can individually be any lumiphor, a wide variety of which are known to those skilled in the art. For example, the one or more luminescent materials in the lumiphor can be selected from among phosphors, scintillators, day glow tapes, inks which glow in the visible spectrum upon illumination with ultraviolet light, etc. The one or more luminescent materials can be down-converting or up-converting, or can include a combination of both types.

For example, light emitting diodes and lumiphors which may be used in practicing the present invention are described in:

(1) U.S. patent application Ser. No. 60/753,138, filed on Dec. 22, 2005, entitled "Lighting Device" (inventor: Gerald H. Negley), the entirety of which is hereby incorporated by reference;

(2) U.S. patent application Ser. No. 60/794,379, filed on Apr. 24, 2006, entitled "Shifting Spectral Content in LEDs by Spatially Separating Lumiphor Films" (inventors: Gerald H. Negley and Antony Paul van de Ven), the entirety of which is hereby incorporated by reference;

(3) U.S. patent application Ser. No. 60/808,702, filed on May 26, 2006, entitled "Lighting Device" (inventors: Gerald H. Negley and Antony Paul van de Ven), the entirety of which is hereby incorporated by reference;

(4) U.S. patent application Ser. No. 60/808,925, filed on May 26, 2006, entitled "Solid State Light Emitting Device and Method of Making Same" (inventors: Gerald H. Negley and Neal Hunter), the entirety of which is hereby incorporated by reference;

(5) U.S. patent application Ser. No. 60/802,697, filed on May 23, 2006, entitled "Lighting Device and Method of Making" (inventor: Gerald H. Negley), the entirety of which is hereby incorporated by reference;

(6) U.S. patent application Ser. No. 60/839,453, filed on Aug. 23, 2006, entitled "LIGHTING DEVICE AND LIGHTING METHOD" (inventors: Antony Paul van de Ven and Gerald H. Negley), the entirety of which is hereby incorporated by reference;

(7) U.S. patent application Ser. No. 60/857,305, filed on Nov. 7, 2006, entitled "LIGHTING DEVICE AND LIGHTING METHOD" (inventors: Antony Paul van de Ven and Gerald H. Negley, the entirety of which is hereby incorporated by reference;

(8) U.S. patent application Ser. No. 60/851,230, filed on Oct. 12, 2006, entitled "LIGHTING DEVICE AND METHOD OF MAKING SAME" (inventor: Gerald H. Negley, the entirety of which is hereby incorporated by reference; and (9) U.S. patent application Ser. No. 60/839,453, filed on Aug. 23, 2006, entitled "LIGHTING DEVICE AND LIGHTING METHOD" (inventors: Antony Paul van de Ven and Gerald H. Negley), the entirety of which is hereby incorporated by reference.

The solid state light emitters can emit light of any desired color (e.g., color coordinates u', v' on a 1976 CIE diagram).

As noted above, in some embodiments according to the present invention, LEDs are arranged in series in strings (the respective strings being arranged in parallel relative to one another) of sufficient length that the forward voltage across the LED string is slightly less than the rectified AC main supply. By matching the forward voltage of the string to the line voltage, it is possible to minimize the amount of power lost in the conversion and regulation. In such embodiments, the solid state light emitters can be provided in any desired number of series strings.

In some embodiments according to the present invention, LEDs are arranged in series with "negative headroom", i.e., slightly higher string current than available voltage. Such an arrangement in such embodiments causes the LEDs to be run just below regulation. If LEDs are instead arranged with "positive headroom", there is a "delta voltage drop" which is a "loss". Accordingly, with "negative headroom" (just below regulation), the LEDs can run at or near peak efficiency.

As noted above, in some embodiments according to the present invention, the circuit further comprises at least one rectifier and/or at least one capacitor.

Persons of skill in the art are familiar with, and have access to, a variety of rectifiers, and any such rectifiers can be employed in the circuits according to the present invention. A representative example of a suitable type of rectifier is a bridge rectifier.

Persons of skill in the art are familiar with, and have access to, a variety of capacitors, and any such capacitors can be employed in the circuits according to the present invention. The capacitance can be of any desired value.

As noted above, in some embodiments according to the present invention, the circuit further comprises at least one fan.

In some embodiments according to the present invention, in order to reduce the weight and improve the attractiveness of the lighting device, a small fan can be positioned so as to circulate air over the solid state light emitters and expel the air from the lighting device. Such small fans are generally of low voltage and, if used at the low voltage, require very little power (typically in the range 0.25 W to 1 W). In order to efficiently generate a low voltage to operate such a fan (or fans), there can be provided a circuit in which a fan replaces some of the solid state light emitters in one or more series strings of solid state light emitters, thereby using the parallel connection of strings to provide the current and a series connection of the fan to a string or strings to provide the voltage. Such an arrangement provides a very efficient way of deriving the power needed for the fan(s). The fan(s) can, if desired, be mounted internal to the lighting device.

Alternatively or additionally, one or more long-life cooling device can be employed. Such long-life cooling device(s) can comprise piezoelectric or magnetorestrictive materials (e.g., MR, GMR, and/or HMR materials) that move air as a "Chinese fan".

As noted above, in some embodiments according to the present invention, an anode of the first series current regulator is electrically connected to a cathode of one of the first group solid state light emitters. In some embodiments according to the present invention, all of the first group solid state light emitters are upstream of the first series current regulator (i.e., the regulator is connected to the cathode end of the string). If the regulator is connected to the anode end of the string, in a 'floating' mode, both input and output voltages can vary greatly, especially during power-up, possibly creating a differential greater than the rating of the regulator. Connecting the regulator instead to the cathode position at the power supply ground end of the string, the voltage swings of the negative terminal of the regulator can be reduced or avoided, providing a useful advantage.

Light sources employing circuits according to the present invention can utilize specific color "blending" of light sources of specific (x,y) color chromaticity coordinates. Solid state light emitters and any lumiphors can be selected so as to produce any desired mixtures of light. Representative examples of suitable combinations of such components to provide desired light mixing are described in:

(1) U.S. patent application Ser. No. 60/752,555, filed Dec. 21, 2005, entitled "Lighting Device and Lighting Method" (inventors: Antony Paul Van de Ven and Gerald H. Negley), the entirety of which is hereby incorporated by reference;

(2) U.S. patent application Ser. No. 60/752,556, filed on Dec. 21, 2005, entitled "SIGN AND METHOD FOR LIGHTING" (inventors: Gerald H. Negley and Antony Paul van de Ven), the entirety of which is hereby incorporated by reference;

(3) U.S. patent application Ser. No. 60/793,524, filed on Apr. 20, 2006, entitled "LIGHTING DEVICE AND LIGHTING METHOD" (inventors: Gerald H. Negley and Antony Paul van de Ven), the entirety of which is hereby incorporated by reference;

(4) U.S. patent application Ser. No. 60/793,518, filed on Apr. 20, 2006, entitled "LIGHTING DEVICE AND LIGHTING METHOD" (inventors: Gerald H. Negley and Antony Paul van de Ven), the entirety of which is hereby incorporated by reference;

(5) U.S. patent application Ser. No. 60/793,530, filed on Apr. 20, 2006, entitled "LIGHTING DEVICE AND LIGHTING METHOD" (inventors: Gerald H. Negley and Antony Paul van de Ven), the entirety of which is hereby incorporated by reference; and (6) U.S. patent application Ser. No. 11/566,440, filed on Dec. 4, 2006, entitled "LIGHTING DEVICE AND LIGHTING METHOD" (inventors: Antony Paul van de Ven and Gerald H. Negley), the entirety of which is hereby incorporated by reference.

The lighting devices of the present invention can be arranged, mounted and supplied with electricity in any desired manner, and can be mounted on any desired housing or fixture. Skilled artisans are familiar with a wide variety of arrangements, mounting schemes, power supplying apparatuses, housings and fixtures, and any such arrangements, schemes, apparatuses, housings and fixtures can be employed in connection with the present invention. The lighting devices of the present invention can be electrically connected (or selectively connected) to any desired power source, persons of skill in the art being familiar with a variety of such power sources.

Representative examples of arrangements of lighting devices, schemes for mounting lighting devices, apparatus for supplying electricity to lighting devices, housings for lighting devices, fixtures for lighting devices and power supplies for lighting devices, all of which are suitable for the lighting devices of the present invention, are described in:

(1) U.S. patent application Ser. No. 60/752,753, filed Dec. 21, 2005, entitled "Lighting Device" (inventors: Gerald H. Negley, Antony Paul van de Ven and Neal Hunter), the entirety of which is hereby incorporated by reference;

(2) U.S. patent application Ser. No. 60/809,959, filed on Jun. 1, 2006, entitled "Lighting Device With Cooling" (inventors: Thomas G. Coleman, Gerald H. Negley and Antony Paul van de Ven), the entirety of which is hereby incorporated by reference;

(3) U.S. patent application Ser. No. 60/798,446, filed on May 5, 2006, entitled "Lighting Device" (inventor: Antony Paul van de Ven), the entirety of which is hereby incorporated by reference;

(4) U.S. patent application Ser. No. 60/809,595, filed on May 31, 2006, entitled "LIGHTING DEVICE AND METHOD OF LIGHTING" (inventor: Gerald H. Negley), the entirety of which is hereby incorporated by reference;

(5) U.S. patent application Ser. No. 60/845,429, filed on Sep. 18, 2006, entitled "LIGHTING DEVICES, LIGHTING ASSEMBLIES, FIXTURES AND METHODS OF USING SAME" (inventor: Antony Paul van de Ven), the entirety of which is hereby incorporated by reference;

(6) U.S. patent application Ser. No. 60/844,325, filed on Sep. 13, 2006, entitled "BOOST/FLYBACK POWER SUPPLY TOPOLOGY WITH LOW SIDE MOSFET CURRENT CONTROL" (inventor: Peter Jay Myers), the entirety of which is hereby incorporated by reference;

(7) U.S. patent application Ser. No. 60/846,222, filed on Sep. 21, 2006, entitled "LIGHTING ASSEMBLIES, METHODS OF INSTALLING SAME, AND METHODS OF REPLACING LIGHTS" (inventors: Antony Paul van de Ven and Gerald H. Negley), the entirety of which is hereby incorporated by reference;

(8) U.S. patent application Ser. No. 60/809,618, filed on May 31, 2006, entitled "LIGHTING DEVICE AND METHOD OF LIGHTING" (inventors: Gerald H. Negley, Antony Paul van de Ven and Thomas G. Coleman), the entirety of which is hereby incorporated by reference;

(9) U.S. patent application Ser. No. 60/858,881, filed on Nov. 14, 2006, entitled "LIGHT ENGINE ASSEMBLIES" (inventors: Paul Kenneth Pickard and Gary David Trott), the entirety of which is hereby incorporated by reference;

(10) U.S. patent application Ser. No. 60/859,013, filed on Nov. 14, 2006, entitled "LIGHTING ASSEMBLIES AND COMPONENTS FOR LIGHTING ASSEMBLIES" (inventors: Gary David Trott and Paul Kenneth Pickard), the entirety of which is hereby incorporated by reference; and (11) U.S. patent application Ser. No. 60/853,589, filed on Oct. 23, 2006, entitled "LIGHTING DEVICES AND METHODS OF INSTALLING LIGHT ENGINE HOUSINGS AND/OR TRIM ELEMENTS IN LIGHTING DEVICE HOUSINGS" (inventors: Gary David Trott and Paul Kenneth Pickard), the entirety of which is hereby incorporated by reference.

The lighting devices of the present invention can be supplied with electricity in any desired manner. Skilled artisans are familiar with a wide variety of power supplying apparatuses, and any such apparatuses can be employed in connection with the present invention. The lighting devices of the present invention can be electrically connected (or selectively connected) to any desired power source, persons of skill in the art being familiar with a variety of such power sources.

Representative examples of apparatuses for supplying electricity to lighting devices and power supplies for lighting devices, all of which are suitable for the lighting devices of the present invention, are described in U.S. patent application Ser. No. 60/752,753, filed on Dec. 21, 2005, entitled "Lighting Device" (inventors: Gerald H. Negley, Antony Paul Van de Ven and Neal Hunter), the entirety of which is hereby incorporated by reference, and in U.S. patent application Ser. No. 60/798,446, filed on May 5, 2006, entitled "Lighting Device" (inventor: Antony Paul Van de Ven), the entirety of which is hereby incorporated by reference.

If desired, circuitry can be provided in which (1) electricity is normally supplied to the circuit for the lighting device through electrical service (e.g., connected to the grid) under normal conditions, and in which (2) if electrical service is interrupted (e.g., in the case of a power outage), one or more switches can be closed whereby power can be supplied to some (e.g., at least about 5 percent or at least about 20 percent) or all of the solid state light emitters. Where necessary, there is preferably further provided a device which detects when electrical service has been interrupted, and automatically switches on battery power to at least some of the solid state light emitters.

In a first embodiment according to the present invention, a 117 VAC line voltage is used. This line voltage is then rectified it through a bridge rectifier and the resulting pulsating DC voltage is applied across approximately 200 µF (micro farads) of capacitance. The resulting smooth DC voltage can be calculated to be approximately 1.414 times the line voltage, less the voltage drop across the bridge rectifier. As the light bulb and/or fixture needs to provide reasonably constant illumination, a series current regulator can be added. The series current regulator is approximately 17 mA which is a little less then the rated current for the LEDs in the series strings. The series regulator requires approximately a 4 V minimum across it to maintain regulation.

In this embodiment, the number of LEDs included in each string is calculated by taking the smoothed DC voltage (1.414×(117 V−1.4 V)=163 V), subtracting the minimum voltage drop across the series regulator (163 V−4 V=159 V), then dividing the available voltage (159 V) by the forward voltage of each LED (e.g., 3.5 V for a "white" LED @20 mA), i.e., 159 V/3.5 V=45 LEDs.

This embodiment provides a power supply of 96% percent efficiency (159 V/(117×1.414)). As each LED provides approximately 3 lumens, it can be seen that in order to produce 600 lumens, the light bulb or light fixture would need to be constructed with approximately 200 LEDs.

In this representative embodiment, 6 strings of 45 LEDs (i.e., a total of 270 LEDs) are employed. This provides a light bulb/fixture of approximately 800 lumens and consumes approximately 16 watts with an efficacy of 50 lumens/watt.

Figure 1:
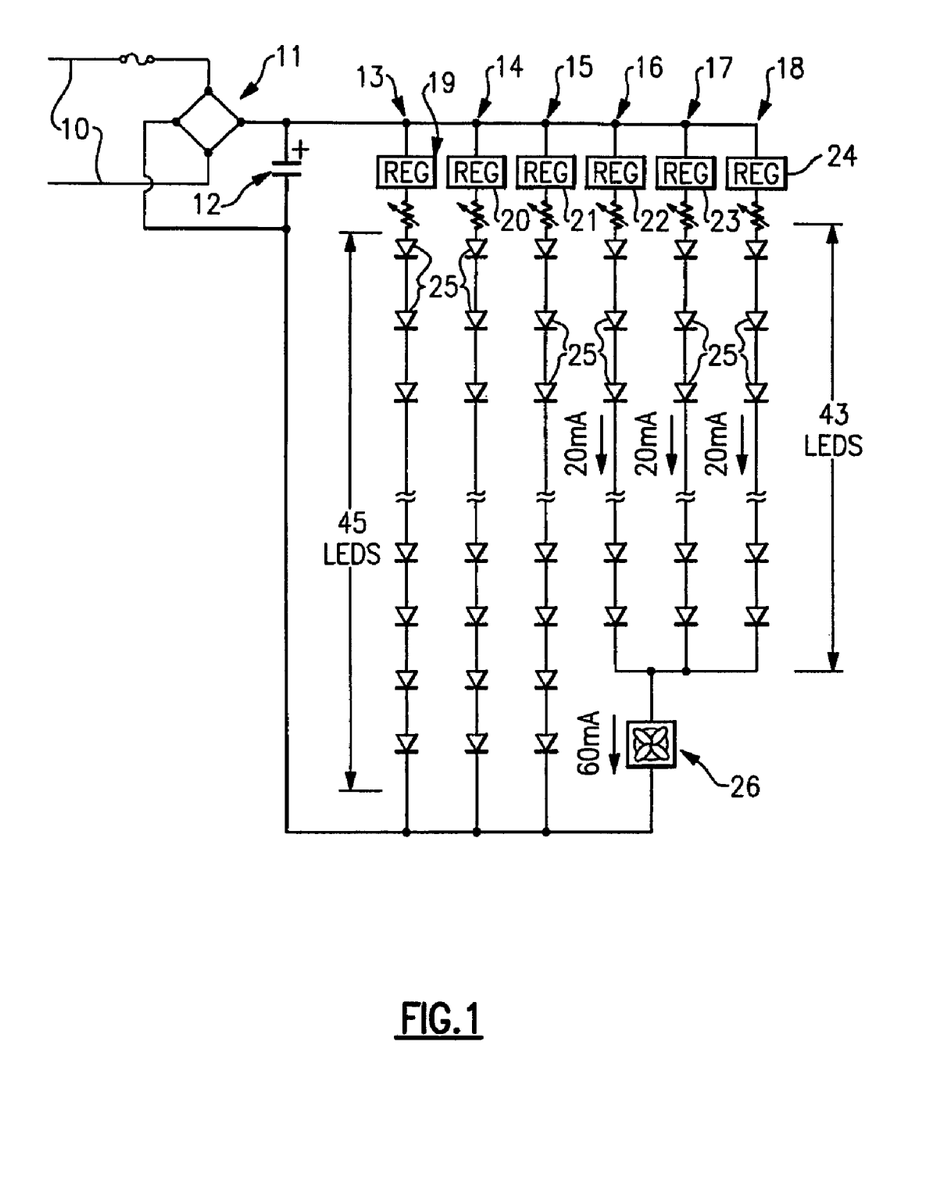
FIG. 1 depicts a first embodiment of a circuit according to the present invention.

FIG. 1 depicts a circuit diagram for an embodiment in accordance with the present invention. Referring to FIG. 1, the circuit includes a line voltage (117 VAC) 10, a bridge rectifier 11, a capacitor 12, six series strings 13, 14, 15, 16, 17 and 18, each series string having a respective series current regulator 19, 20, 21, 22, 23 and 24. Three of the strings (13, 14 and 15) each have forty-five LEDs 25 in series. The other three strings (16, 17 and 18) each have forty-three LEDs 25 in series, and they all connect, in series, to a fan 26. Each of the series strings 13, 14, 15, 16, 17 and 18 is regulated to about 20 mA, such that about 20 mA passes through each of the LEDs 25, and about 60 mA passes through the fan 26.

Figure 2:
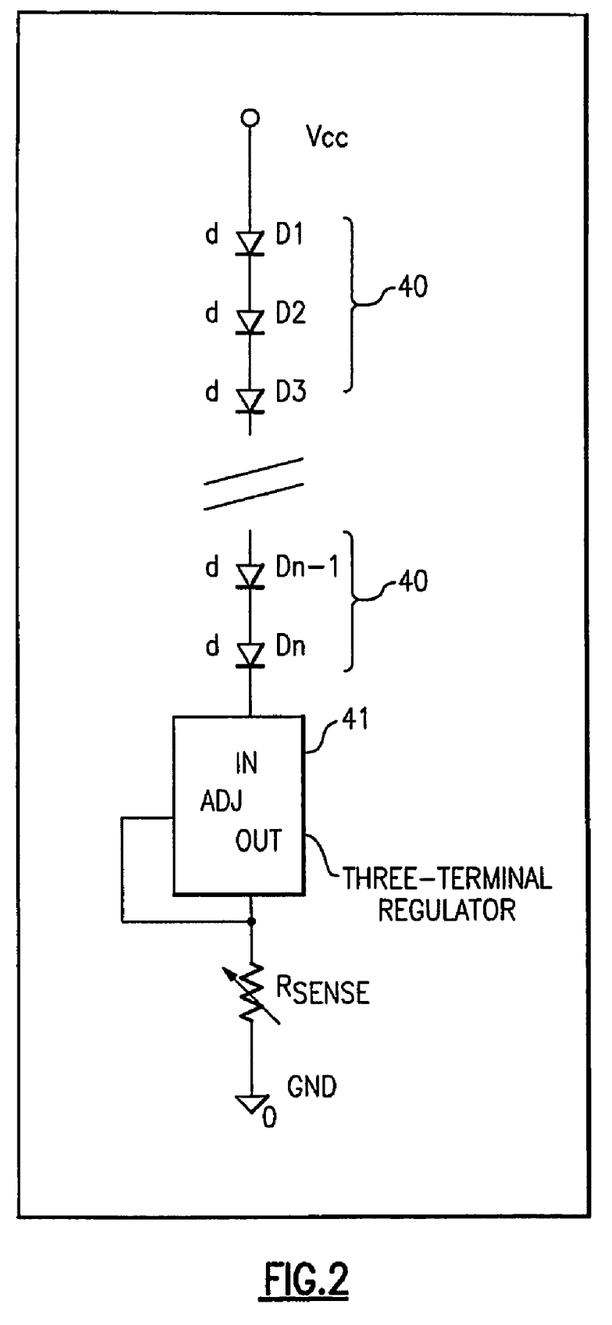
FIG. 2 depicts a circuit diagram for an embodiment of a series string which can be employed in devices according to the present invention.

FIG. 2 depicts a circuit diagram for an embodiment of a series string which can be employed in devices according to the present invention. Referring to FIG. 2, the circuit includes a plurality of LEDs 40 and a series current regulator 41.

The expression "lighting device" as used herein is not limited, except that it is capable of emitting light. That is, a lighting device can be a device which illuminates an area or volume (e.g., a room, a swimming pool, a warehouse, an indicator, a road, a vehicle, a road sign, a billboard, a ship, a boat, an aircraft, a stadium, a tree, a window, a yard, etc.), an indicator light, or a device or array of devices that illuminate an enclosure, or a device that is used for edge or back-lighting (e.g., back light poster, signage, LCD displays), or any other light emitting device.

Any two or more structural parts of the circuits described herein can be integrated. Any structural part of the circuits described herein can be provided in two or more parts (which are held together, if necessary). Similarly, any two or more functions can be conducted simultaneously, and/or any function can be conducted in a series of steps.

The invention claimed is:

1. A circuit for a lighting device, said circuit comprising:
at least a first sub-circuit and at least one fan,
said first sub-circuit comprising at least a first series current regulator and a first group of solid state light emitters,
said first group of solid state light emitters comprising a plurality of first group solid state light emitters,
said first series current regulator and said plurality of first group solid state light emitters arranged in series,
said fan electrically connected in series in at least said first sub-circuit.

2. A circuit as recited in claim 1, wherein said circuit further comprises at least one rectifier.

3. A circuit as recited in claim 1, wherein said circuit further comprises at least one capacitor.

4. A circuit as recited in claim 1, wherein said first sub-circuit comprises at least 40 solid state light emitters.

5. A circuit as recited in claim 1, wherein said first sub-circuit comprises fewer than 10 solid state light emitters.

6. A circuit as recited in claim 1, wherein said first sub-circuit comprises fewer than 5 solid state light emitters.

7. A circuit as recited in claim 1, further comprising at least a second sub-circuit, said second sub-circuit comprising at least a second series current regulator and a second group of solid state light emitters,
said second group of solid state light emitters comprising a plurality of second group solid state light emitters,
said second series current regulator and said plurality of second group solid state light emitters arranged in series,
said first sub-circuit and said second sub-circuit arranged in parallel relative to each other.

8. A circuit as recited in claim 7, wherein said fan is electrically connected in series to at least said first sub-circuit and said second sub-circuit.

9. A circuit as recited in claim 1, wherein an anode of said first series current regulator is electrically connected to a cathode of one of said first group solid state light emitters.

10. A circuit as recited in claim 9, wherein all of said first group solid state light emitters are upstream of said first series current regulator.

11. A method of lighting, comprising:
supplying current of a first voltage to a circuit, said circuit comprising:
at least a first sub-circuit, said first sub-circuit comprising at least a first series current regulator and a first group of solid state light emitters, and
at least a first fan, said first fan electrically connected in series in at least said first sub-circuit,
said first group of solid state light emitters comprising a plurality of first group solid state light emitters,
said first series current regulator and said plurality of first group solid state light emitters arranged in series,
wherein a sum of voltage drops across said plurality of first group solid state light emitters and said first series current regulator is in the range of from 1.2 to 1.6 times said first voltage.

12. A method as recited in claim 11, wherein said first voltage is in the range of from about 90 volts to about 140 volts.

13. A method as recited in claim 11, wherein said first voltage is about 110 volts.

14. A method as recited in claim 11, wherein said first voltage is about 220 volts.

15. A method as recited in claim 11, wherein said first voltage is about 240 volts.

16. A method as recited in claim 11, wherein said first voltage is about 277 volts.

17. A method as recited in claim 11, wherein said circuit further comprises at least one rectifier.

18. A method as recited in claim 11, wherein said circuit further comprises at least one capacitor.

19. A method as recited in claim 11, wherein said first sub-circuit comprises at least 40 solid state light emitters.

20. A method as recited in claim 11, wherein said first sub-circuit comprises fewer than 10 solid state light emitters.

21. A method as recited in claim 11, wherein said first sub-circuit comprises fewer than 5 solid state light emitters.

22. A method as recited in claim 11, wherein said circuit further comprises at least a second sub-circuit, said second sub-circuit comprising at least a second series current regulator and a second group of solid state light emitters,
said second group of solid state light emitters comprising a plurality of second group solid state light emitters,
said second series current regulator and said plurality of second group solid state light emitters arranged in series,
said first sub-circuit and said second sub-circuit arranged in parallel relative to each other.

23. A method as recited in claim 22, wherein said first fan is electrically connected in series to at least said first sub-circuit and said second sub-circuit.

24. A method as recited in claim 11, wherein an anode of said first series current regulator is electrically connected to a cathode of one of said first group solid state light emitters.

25. A method as recited in claim 24, wherein all of said first group solid state light emitters are upstream of said first series current regulator.

* * * * *